United States Patent
Mattes (10) Patent No.: US 8,172,562 B2
(45) Date of Patent: May 8, 2012

(54) DEVICE AND METHOD FOR PRODUCING A THREE-DIMENSIONAL OBJECT BY MEANS OF A GENERATIVE PRODUCTION METHOD

(75) Inventor: Thomas Mattes, Germering (DE)

(73) Assignee: EOS GmbH Electro Optical Systems, Krailling (DE)

( * ) Notice: Subject to any disclaimer, the term of this patent is extended or adjusted under 35 U.S.C. 154(b) by 881 days.

(21) Appl. No.: 10/523,558

(22) PCT Filed: Jul. 31, 2003

(86) PCT No.: PCT/EP03/08520
§ 371 (c)(1),
(2), (4) Date: Oct. 20, 2005

(87) PCT Pub. No.: WO2004/014637
PCT Pub. Date: Feb. 19, 2004

(65) Prior Publication Data
US 2006/0108712 A1    May 25, 2006

(30) Foreign Application Priority Data
Aug. 2, 2002   (DE) .................................. 102 35 434

(51) Int. Cl.
*B29C 67/04* (2006.01)
(52) U.S. Cl. ............... 425/174.4; 425/174; 425/375; 264/112; 264/113; 264/125; 264/126; 264/497
(58) Field of Classification Search ............ 264/112, 264/113, 125, 126, 401, 497; 425/174, 174.4, 425/375
See application file for complete search history.

(56) References Cited

U.S. PATENT DOCUMENTS

| | | | |
|---|---|---|---|
| 4,323,756 A * | 4/1982 | Brown et al. | 219/121.66 |
| 5,134,569 A * | 7/1992 | Masters | 700/182 |
| 5,637,175 A | 6/1997 | Feygin et al. | |
| 5,753,274 A | 5/1998 | Wilkening et al. | |
| 6,042,774 A | 3/2000 | Wilkening et al. | |
| 2001/0050448 A1 | 12/2001 | Kubo et al. | |
| 2003/0205851 A1 | 11/2003 | Laschutza et al. | |

FOREIGN PATENT DOCUMENTS

| | | |
|---|---|---|
| CA | 2425468 A1 * | 7/2003 |
| DE | 2 263 777 | 7/1973 |
| DE | 299 07 262 U1 | 8/1999 |
| DE | 199 52 998 A 1 | 5/2001 |

(Continued)

OTHER PUBLICATIONS

English translation of DE19952998.*

*Primary Examiner* — Joseph Del Sole
*Assistant Examiner* — Timothy Kennedy
(74) *Attorney, Agent, or Firm* — McDonnell Boehnen Hulbert & Berghoff LLP (57) ABSTRACT

There are provided a device and a method for layer-wise generative manufacturing of three-dimensional objects by selective solidification of a solidifiable building material in liquid or powder form. By a rotational movement of the building region (2), in which the objects are manufactured, with respect to a material application device (7) for applying layers of the building materials and a solidification arrangement (1) the material application device (7) and the solidification arrangement (1) can be used simultaneously at different places in the building region.

15 Claims, 6 Drawing Sheets

FOREIGN PATENT DOCUMENTS

| | | |
|---|---|---|
| DE | 199 57 370 C2 | 3/2002 |
| EP | 0 734 842 B1 | 8/1999 |
| FR | 2.166.526 | 7/1973 |
| JP | 2001-334581 | 4/2001 |
| JP | 2001-150557 | 5/2001 |
| JP | 2004-42611 | 12/2004 |

* cited by examiner

DEVICE AND METHOD FOR PRODUCING A THREE-DIMENSIONAL OBJECT BY MEANS OF A GENERATIVE PRODUCTION METHOD

The present invention is related to a device and a method for manufacturing a three-dimensional object by a generative manufacturing method.

In generative manufacturing methods, e.g. selective laser sintering, stereolithography, the LOM method (laminated object manufacturing), the FDM method (fused model deposition), three-dimensional printing (solidifying of material in powder form by a glue or by a chemical reaction, in particular by using multi component systems consisting of binder/hardener or by fusing a thermoplastic), the three-dimensional object is manufactured layer-wise by applying layers of a building material which are interconnected at positions corresponding to a cross-section of the object.

A device for layer-wise manufacturing of a three-dimensional object by selective laser sintering is for example known from EP 0 734 842. There, a first layer of a material in powder form is applied onto a support, which may be lowered, and irradiated at positions corresponding to the object, so that the material sinters together there. Then the support is lowered and a second layer is applied onto this first layer and again is selectively sintered, so that it is connected to the first layer. Thus, the object is formed layer-wise.

In this application an application of layers of a building material is not related to a self-flow of the material into the space between the bottom of the container and the support, as it is for example described in DE 199.57 370.

When manufacturing objects, prior art laser sintering machines execute the basic steps like dosage, layer-forming, tempering and irradiation in a serial way or have these only partially parallelized on principle. Through this the method comprises long periods in which no material is solidified. It follows a reduced productivity of a machine with respect to the theoretical maximum of productivity, that results from the available laser power as well as the sensitivity of the material to be solidified. Something similar applies to devices, that are known for the other generative manufacturing methods cited above.

It is an object of the present invention to rise the speed of production of a device for layer-wise manufacturing of three-dimensional objects as well as to rise the productivity of an accompanying method.

This object is achieved by a device according to the present disclosure and a method according to the present disclosure.

Further developments are also described in the present disclosure.

Further features and usefulnesses of the invention arise from the description of embodiments considering the Figures, of which.

FIRST EMBODIMENT

Figure 1:
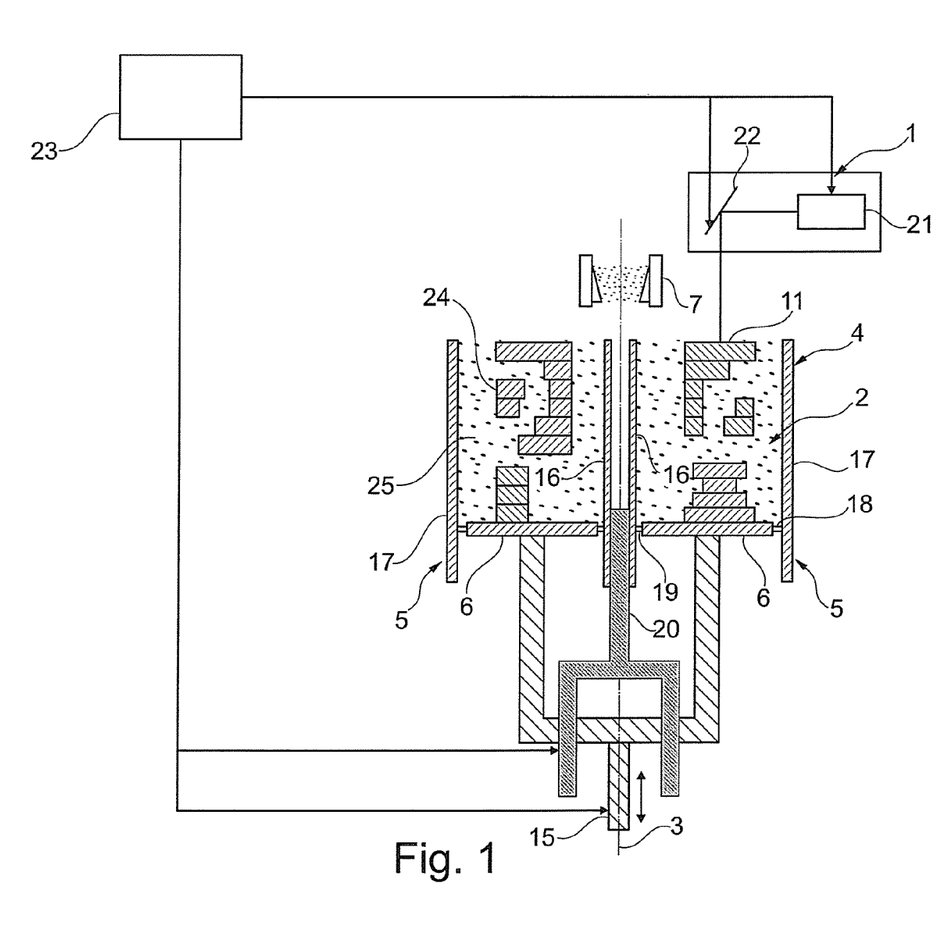
FIG. 1 shows a side view of a device according to a first embodiment of the present invention.

FIG. 1 shows a cross-sectional embodiment of a device for layer-wise manufacturing of three-dimensional objects according to a first embodiment of the invention. The device comprises a building region of a not necessarily circular cross-section. This is taken up by a building container 4 having an outer boundary surface 17 and an inner boundary surface 16, which is open at the top. Due to the provision of the inner boundary surface 16 the building space, which is defined by the outer boundary surface 17 comprises a cavity. A building platform 6 serves as lower boundary of the building container 4 and is designed such, that it completely fills the region between the inner boundary surface 16 and the outer boundary surface 17. The building platform 6 comprises at its inner edge a seal 19 for sealing the gap between the inner boundary surface 16 and building platform 6. The building platform 6 comprises at its outer edge a seal 18 for sealing the gap between the outer boundary surface 17 and the building platform 6. It is not inevitably necessary to provide an inner boundary surface 16. If only an outer boundary surface 17 exists, the building container 4 does not comprise a cavity in its centre and the building platform 6 does not comprise a hole in the centre.

The building platform 6 is connected to a vertical drive 15, which enables an up and down movement of the building platform 6 in a vertical direction. The whole building container 4 is connected to a drive 20, which makes the building container 4 move around an axis of rotation 3, which coincides with the symmetry axis of the building container 4. The connection between the building container 4 and the drive 20 is designed such, that it can be disconnected immediately below the building container 4, so that the building container 4 can be removed from the building region 2.

A material application device 7 for applying the material, that is to be applied onto the building platform, is arranged above the building container 4. This material application device reaches in a radial direction across the maximum radial extension of the building container. A solidification device in the form of a laser 21 and a deflection unit 22 is arranged above the material application device 7. The deflection unit is suitable for directing the laser beam onto arbitrary places within a solidification region 11. Preferably the deflection unit is an xy-scanner. The solidification region 11 is a sub-region within the building region 2 being fixed in relation to the position of the material application devices and being located at the level of the layer, which was deposited by the material application devices.

As illustrated in FIG. 1, the laser 21, the deflection unit 22, the vertical drive 15 and the drive 20 are connected to a controller 23. Further, FIG. 1 shows a formed object 24 that is surrounded by non-solidified material 25.

Next, an operation of the device of the first embodiment will be described. First, the building platform 6 is positioned such, that its top surface flushes with the upper edge of the building container 4. Then, the controller 23 initiates the movement of the building container 4 around the axis of rotation 3 with uniform velocity by the drive 20, where the material application device 7 applies material to be solidified onto the building platform 6. Then the illumination process by laser is initiated. The laser solidifies the material at selective places within a stationary solidification region 11, below which the building container 4 is moving. The application of material by the material application device 7 is carried out in such a way, that the applied layer, has a predetermined thickness d when it enters the solidification region 11 covered by the laser radiation. Further it can be carried out automatically without the participation of the controller. Further, the controller 23 controls the vertical drive 15 in such a way, that during a full cycle of revolution of the building container, the building platform is lowered by an amount of the layer thickness d. During each cycle of revolution of the building container 4 the material that was applied at places outside of the solidification region 11, is solidified within the solidification region 11.

The advantage of this embodiment is that during the solidification of the applied material in one surface region of the object(s) to be produced new material is applied in other surface regions of the object(s) to be produced. By making parallel the material application and the solidification the productivity is raised when manufacturing objects. Unproductive times, during which the material is dosed, deposited and tempered and no solidification takes place, are no longer present. Further, the relative movement of the application device 7 with respect to the building container 4 all the time is only in one direction. From this follows among other a better temperature stability, leading to a number of advantages, for example a higher security of the method and a higher precision as well as a freedom of warpage and stress of the parts. Further, the size and the number of the objects to be manufactured is not limited by the region, that is covered by the deflection unit. Thus, the device is suitable for a production of large quantities of parts with the same properties.

SECOND EMBODIMENT

Figure 2:
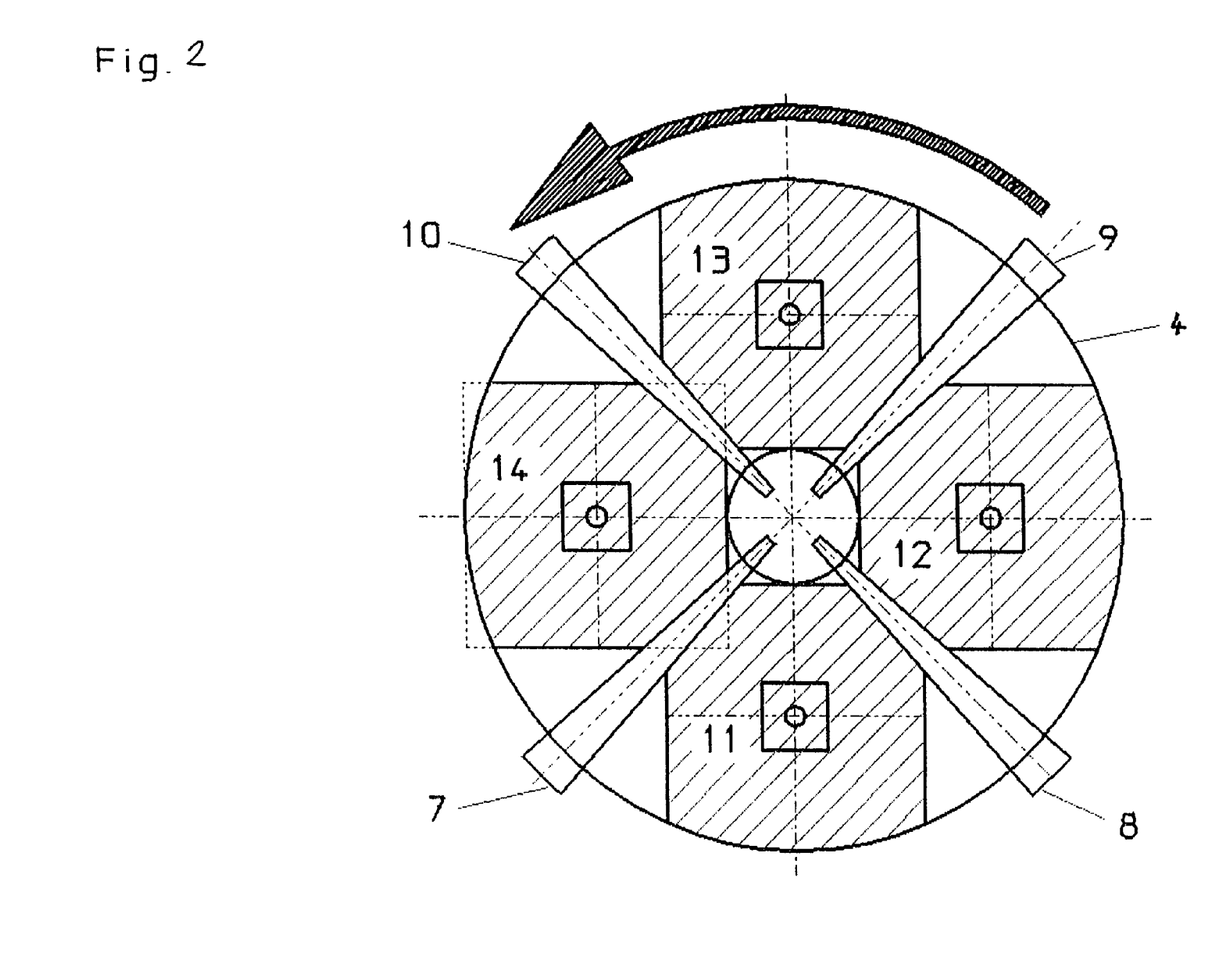
FIG. 2 shows a top view of a device according to a second embodiment of the present invention.

A second embodiment differs from a first embodiment in that several solidification devices 1 and several material application devices 7 exist. Further, each solidification device is assigned to a material application device 7 and to a solidification region within the building region 2.

FIG. 2 shows as an example a top view of a device with four solidification regions 11, 12, 13, 14, each being located between the material application devices 7 and 8 and the material application devices 8 and 9 and the material application devices 9 and 10 and the material application devices 10 and 7, respectively.

Figure 3:
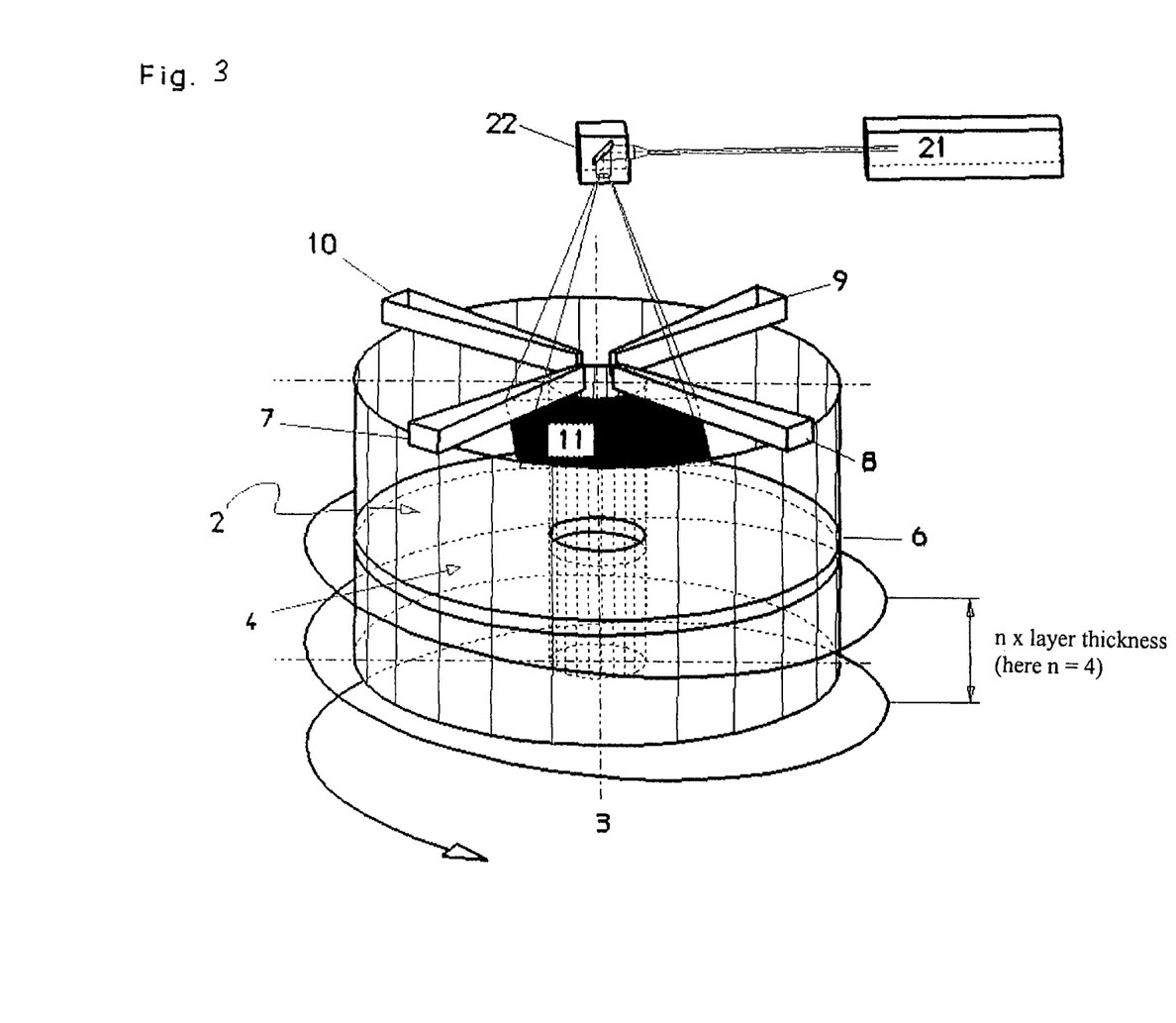
FIG. 3 shows a perspective view of a device according to a second embodiment of the invention.

The operation of a device according to the second embodiment of the invention differs from the operation of a device according to the first embodiment in that the applied material layer is concurrently solidified in all solidification regions. In the device, that is illustrated in FIG. 1, for example the material, that was applied by the material application device 7 is solidified in the solidification region 11, the material, that was applied by the material application device 8, is solidified in the solidification region 12, the material, that was applied by the material application device 9 is solidified in the solidification region 13 and the material, that was applied by the material application device 10 is solidified in the solidification region 14. Further, each of the material application devices deposits the material with a layer thickness d. If in general n designates the number of existing solidification regions, then during one revolution of the building container the building platform has to be lowered by n times the layer thickness n×d, as it is illustrated in FIG. 3 for n=4. For reasons of simplification of the illustration, FIG. 3 shows only one of the solidification devices 1.

Compared to the first embodiment the use of the second embodiment of the invention allows a further rise of the productivity, because the building material is solidified concurrently in several areas of the object(s) to be built up.

First Modification of the First and Second Embodiment

A first modification of the device according to the first or second embodiment comprises a drive 20, capable of changing the speed of revolution during the revolution of the building container in steps or continuously.

In an operation of the first modification of the device of the first embodiment the velocity of revolution of the building container around the axis of rotation 3 is increased, when material of an applied layer, which is not to be solidified, traverses the solidification region 11. Thus, the production speed can be increased as the length of time, during which no building material is solidified, is shortened.

Preferably the velocity of revolution of the building container is varied in depending on the extension of the partial regions of the applied layer, that are to be solidified. As a result the actual velocity of revolution is determined by the extension of the largest partial region of the applied layer within one of the solidification regions, that is to be solidified selectively. If always this maximum possible velocity of revolution is set as velocity of revolution of the building container, this leads to an increase of the production speed.

Second Modification of the First and Second Embodiment

In a second modification the operational mode is modified in such a way, that the thickness d of the layer, that is deposited by the material application devices, varies. When doing this, the speed of lowering of the building platform 6 is adapted to the thickness d' of the layer, which was deposited in a partial region of the building region 2. As a result the layer thickness can be adapted to the local geometrical requirements of the part to be built up. If for example there is a local demand for an increased resolution of details, one layer or several layers with a decreased thickness can be applied. Thus, the construction process can be optimized.

Third Modification of the First and Second Embodiment

In a third modification of the device of the first or second embodiment of the invention the drive 20 is not connected to the building container 4, but is connected to the solidification devices 1 and the material application devices 7, 8, 9, 10. Therefore, in operation the building container 4 maintains its position while the drive 20 induces the solidification devices 1 and the material application devices 7, 8, 9, 10 to move with respect to the building container 4 around the axis of rotation 3. It is of course possible that the solidification devices 1 and the material application devices 7, 8, 9, 10 as well as the building container 4 move with respect to one another.

Fourth Modification of the First and Second Embodiment

In a fourth modification of the first and second embodiment the building platform can not be lowered continuously, but stepwise. That means, the lowering is carried out for example after an accomplished solidification. This has the advantage, that the focussing of the laser beam onto the layer to be solidified, is simplified, as thereby the applied layers are in parallel to a horizontal plane.

THIRD EMBODIMENT

Figure 4:
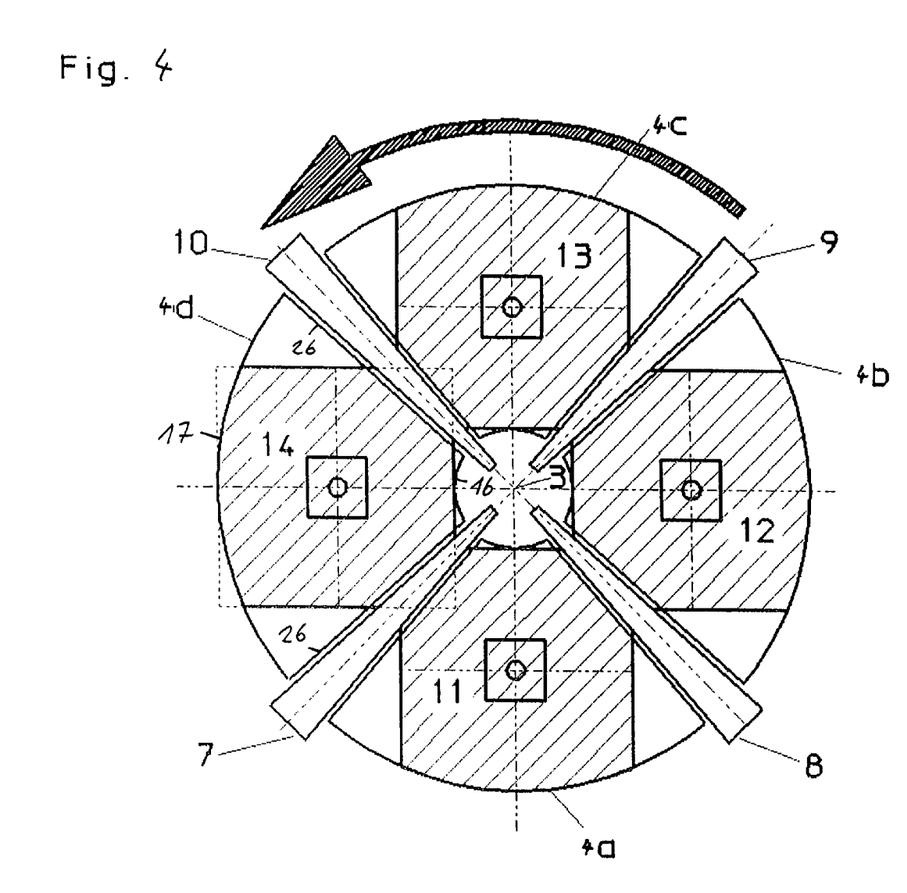
FIG. 4 shows a top view of a device according to a third embodiment of the present invention.
Figure 5:
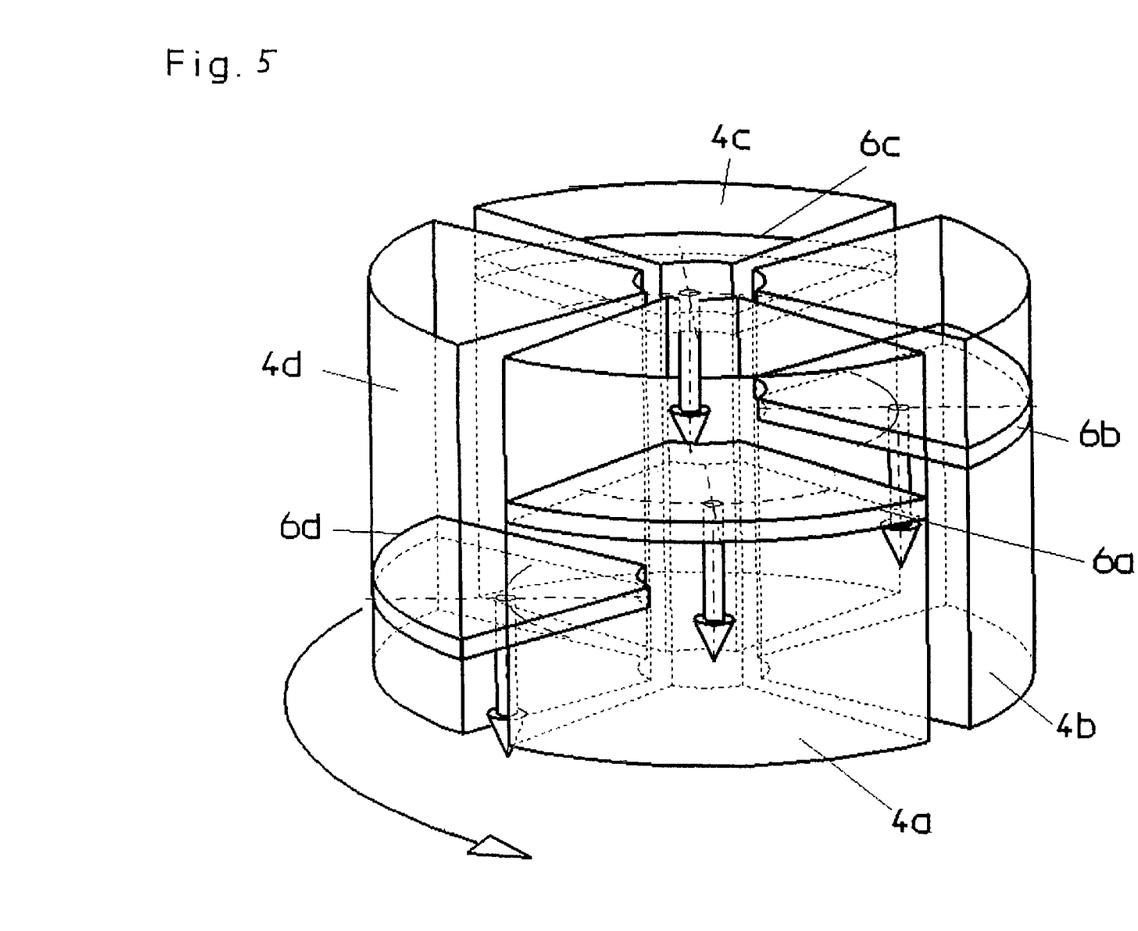
FIG. 5 shows a perspective view of a device according to a third embodiment of the invention.

FIGS. 4 and 5 show a third embodiment of the invention. The third embodiment differs from the second embodiment in that the building container 4 is substituted by a plurality of building containers. In FIGS. 4 and 5 the building region is exemplary taken up by four building containers 4a, 4b, 4c, 4d. Each of the building containers 4a and 4b and 4c and 4d, respectively, comprises a building platform 6a and 6b and 6c and 6d, respectively, and has an outer boundary surface 17, an inner boundary surface 16 as well as lateral boundary surfaces 26. In each case a construction platform 6a and 6b and 6c and 6d, respectively, serves as a lower boundary of the building container 4a and 4b and 4c and 4d, respectively, and extends between the outer boundary surface 17, the inner boundary surface 16 as well as the lateral boundary surfaces 26. The gap between the construction platform and the boundary surfaces is sealed by a seal in an analogous way to the foregoing embodiments. The horizontal cross-sectional areas of the individual building containers can have any shape and need not necessarily be identical.

As can be seen from FIG. 4, a plurality of material application devices 7, 8, 9, 10 for applying building material onto the construction platforms 4a, 4b, 4c, 4d are arranged around the axis of rotation 3. Preferably the number of material application devices corresponds to the number of building containers. Several deflection units 22 and/or lasers 21 are arranged above the material application devices 7, 8, 9, 10. Further, each of the deflection units is capable of directing the laser beam to any place within a solidification region, that is assigned to the deflection unit. Here, each deflection unit is assigned to a solidification region inside of the construction region 2. Preferably the number of building containers corresponds to the number of solidification regions. FIG. 4 shows as an example a top view of a device having four solidification regions 11, 12, 13, 14, each being located between the material application devices 7 and 8 and the material application devices 8 and 9 and the material application devices 9 and 10 and the material application devices 10 and 7, respectively.

Each of the building platforms 6a and 6b and 6c and 6d, respectively, is connected to a vertical drive 15a and 15b and 15c and 15d, respectively, which is not shown in the Figures and enables an up and down movement of the building platforms in a vertical direction. Here, in each case the connection between the vertical drive and the building container can be disconnected immediately below the building container so that each of the building containers can be removed from the building region 2 independently from the other building containers. For a simplification of the setup also a single vertical drive 15 may be present, to which all building platforms 6a, 6b, 6c, 6d are connected. All building containers 4a, 4b, 4c, 4d are connected to a drive 20, which can set the building containers 4a, 4b, 4c, 4d synchronously to each other in a motion around the axis of rotation 3. The laser 21, the deflection units 22, the vertical drives 15a, 15b, 15c, 15d and the drive 20 are connected to a controller 23.

Next, an operation of the device of the third embodiment will be described. By the controller 23 the drive 20 is induced to move the building containers 4a, 4b, 4c, 4d synchronously with uniform velocity around the axis of rotation 3. The material application devices 7, 8, 9, 10 apply material, that is to be solidified onto the building platforms 6a, 6b, 6c and 6d. As in the second embodiment the applied material layer is solidified concurrently in all solidification regions. For example in the device illustrated in FIG. 4 the material, which was applied by the material application device 7, is solidified in the solidification region 11, the material which was applied by the material application device 8 is solidified in the solidification region 12, the material, which was applied by the material application device 9 is solidified in the solidification region 13 and the material, which was applied by the material application device 10 is solidified in the solidification region 14. Here, each of the material application devices deposits material with a layer thickness d. Out of this reason the drives 15a, 15b, 15c, 15d are controlled in such a way, that each of the building platforms 4a, 4b, 4c, 4d is lowered by a quadruple of the layer thickness 4×d during one revolution of the associated building container. If generally n designates the number of existing solidification regions, then the respective building platforms have to be lowered during one revolution of the associated building container by n times the layer thickness n×d.

The advantage of the third embodiment results from an increased flexibility. The device can be operated with only a subset of the building containers, even with only one building container. This allows to decrease the building volume in order to adapt it to the size of the parts to be solidified. Thus, the amount of employed starting material, which is not to be solidified, is reduced. This is of particular importance for the processing of thermoplastics. There, starting material, that has not been used up, can be used again, however, due to a thermal damage this is only possible by an increased application of fresh material as an admixture. A further advantage results from the fact, that in the case of an early completion of individual parts the associated building containers can be removed and can be replaced by new building containers early. Then, in the new building containers the building of new parts already takes place, while the parts in the rest of the building containers are completed. This allows to achieve an increase of productivity.

First Modification of the Third Embodiment

Optionally the building platforms cannot be lowered continuously, but stepwise. This means that the lowering takes place for example after a completed solidification in all solidification regions. This has the advantage, that the focussing of the laser beam onto the layer to be solidified, is simplified as the applied layers are parallel to the horizontal plane.

Second Modification of the Third Embodiment

In a second modification of the third embodiment the layer thickness of the applied layer can be set differently in different building containers. This goes hand in hand with a different lowering velocity of the building platforms in the different building containers. Thereby objects with different layer thicknesses can be manufactured in parallel.

Third Modification of the Third Embodiment

Analogous to the second modification of the first and second embodiment described above it is also possible to vary the thickness d of the layer deposited by the material application devices within one building container or across several building containers. Thereby it is possible to adapt the layer thickness to the local geometrical requirements of the parts to be built up, for example when an increased resolution of details is needed locally. Thus, the building process can be optimized.

Fourth Modification of the Third Embodiment

Figure 6:
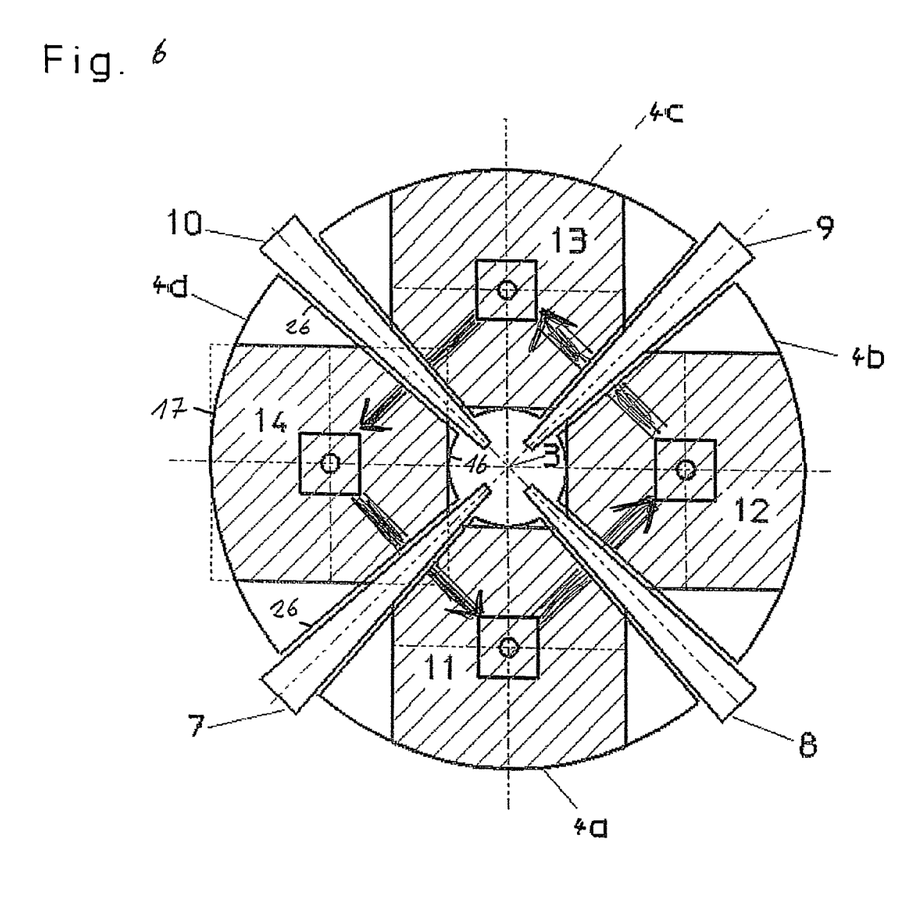
FIG. 6 shows a top view of a non-circular path, and in particular, a polygon with n corners.

In a fourth modification, shown in FIG. 6, wherein the reference characters refer to the same elements of the invention shown in FIG. 4, the building containers do not rotate with respect to an axis of rotation 3. Instead, a guiding drive 27 only leads the building containers on a closed, not necessarily circular path synchronously around the axis of rotation 3. If the device has n, material application devices and n solidification regions, the path preferably corresponds to the boundary of a polygon with n corners optionally each building container additionally rotates on its path around the axis or rotation 3 around an axis of rotation 3', which is parallel to the axis of rotation 3 and which goes through the building container.

Fifth Modification of the Third Embodiment

Analogous to the first modification, which was described above, in a fifth modification of the third embodiment the device comprises a drive 20, which is capable of changing the speed of rotation during the rotation of the building container either in steps or continuously. Thus, the actual speed of rotation can be adapted to the extension of the largest partial region of the applied layer, that is to be selectively solidified, inside of one of the solidification regions. If always this maximum possible speed of rotation is set as speed of rotation of the building container, this leads to an increase of the speed of production.

Sixth Modification of the Third Embodiment

Analogous to the third modification, which was described above, in a sixth modification of the third embodiment the drive 20 is not connected to the building containers 4a, 4b, 4c, 4d, but to the deflection unit 22 and the material application devices 7, 8, 9, 10. Thus in operation the building containers 4a, 4b, 4c, 4d maintain their position while the drive 20 induces a rotational movement of the deflection units 22 and the material application devices 7, 8, 9, 10 around the axis of rotation 3. Of course it is also possible, that the deflection units 22 and the material application devices 7, 8, 9, 10 as well as the building containers 4a, 4b, 4c, 4d rotate with respect to each other.

Of course any combinations of the different modifications of the third embodiment are possible.

In all embodiments instead of the laser and the deflection unit there can be also used other radiation sources, for example an electron beam, microwave radiation, a lamp in combination with a mask, LEDs and other illumination arrays, etc., or other solidification devices, for example binder and glue application devices.

Moreover, the device described above and the method described above can be used in different generative manufacturing methods, for example selective laser sintering, in particular of polymers, stereolithography, the LOM-method (Laminated Object Manufacturing), the FDM-method (Fused Model Deposition) or in three-dimensional printing (solidifying material in powder form by a glue or by a chemical reaction, in particular by using multi-component systems of binder/hardener or by melting of thermoplastics), where the three-dimensional object is manufactured layer-wise by applying layers of a building material and interconnecting them at locations corresponding to the cross-section of the object.

What is claimed is:

1. Apparatus for manufacturing a three-dimensional object by a generative manufacturing method, wherein the object is manufactured in a vertical direction layer-wise from a building material, comprising:
    a building container,
    a support in said building container,
    a material application device for applying layers of a building material onto a said support or a layer, which was applied before, said material application device being arranged above said building container,
    a solidification device for solidifying the building material in the applied layer, wherein said solidification device is able to solidify said building material in the applied layer at positions corresponding to a cross-section of the object such that the building material gets interconnected with a layer, which was applied before,
    a drive connected to said building container, wherein the drive functions to generate a movement of said building container around an axis of rotation,
    a vertical drive connected to said support, which functions to generate a vertical movement of said support, and
    a controller connected to said solidification device, said drive and said vertical drive, characterized in that
    said controller is configured to control said solidification device and said drive such that, during active operation of said solidification device on said building material in said solidification region said drive is simultaneously generating a movement of said building container around said access of rotation along with application of building material by said material application device, which is stationary,
    wherein said solidification device acts on said building material in a solidification region below which the building container is moving.

2. Apparatus according to claim 1, wherein the vertical drive is able to lower the support continuously or in steps.

3. Apparatus according to claim 1, wherein the controller is configured to lower the support by an amount of a thickness of one layer during a full cycle of revolution of the building container.

4. Apparatus according to claim 1, wherein the controller is configured to vary the speed of lowering of the support.

5. Apparatus according to claim 1, wherein the controller is configured to vary the velocity of revolution of the building container.

6. Apparatus according to claim 1, wherein several solidification regions are provided.

7. Apparatus according to claim 6, wherein several supports are provided.

8. Apparatus according to claim 7, wherein the controller is configured of to lower the several supports independently from each other.

9. Apparatus according to claim 6, wherein the building containers are able to make a rotational movement on a non-circular path, preferably a polygon with n corners, for the case that n supports are provided.

10. Apparatus according to claim 6, wherein several material application devices are provided.

11. Apparatus according to claim 6, wherein to each solidification region there is assigned a solidification device for interconnection of the applied layer to a layer, which was applied before.

12. Apparatus according to claim 1, wherein the building material is in form of powder and the solidification device for interconnection of the applied layer to a layer of the building material, which was applied before, is preferably a laser for sintering the powder or an arrangement for solidification of the powder by a glue.

13. Apparatus according to claim 1, wherein the controller is configured to vary the velocity of revolution of the building container and the speed of lowering of the support, wherein the velocity of revolution and the speed of lowering are varied at the same time and by the same factor.

14. Apparatus according to claim 6, wherein the number of solidification regions equals the number of material application devices such that to each solidification region a material application device is assigned to.

15. Apparatus according to claim 6, wherein a layer applied by said material application device has a thickness d and
    wherein if n designates the number of solidification regions, said controller is configured to lower said support by an amount of n times d during one revolution of the building container.

* * * * *